(12) United States Patent
Biere et al.

(10) Patent No.: US 8,265,693 B1
(45) Date of Patent: Sep. 11, 2012

(54) MOBILE DEVICE AS A PERSONAL COMPUTER ASSISTANT

(75) Inventors: Devon L. Biere, Olathe, KS (US); Michael A. Gailloux, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 875 days.

(21) Appl. No.: 11/760,927

(22) Filed: Jun. 11, 2007

(51) Int. Cl.
*H04B 1/38* (2006.01)

(52) U.S. Cl. ...... 455/557; 455/418; 455/420; 455/556.1

(58) Field of Classification Search .......... 455/418–420, 455/517–519, 557
See application file for complete search history.

(56) References Cited

U.S. PATENT DOCUMENTS

| | | | |
|---|---|---|---|
| 6,633,759 B1* | 10/2003 | Kobayashi | 455/419 |
| 7,571,486 B2* | 8/2009 | Lam | 726/26 |
| 2002/0136214 A1* | 9/2002 | Do et al. | 370/392 |
| 2003/0061381 A1* | 3/2003 | Brisebois et al. | 709/245 |
| 2004/0081110 A1* | 4/2004 | Koskimies | 370/315 |
| 2004/0254908 A1* | 12/2004 | Tada | 707/1 |
| 2006/0240849 A1* | 10/2006 | Suzuki | 455/465 |
| 2007/0045417 A1* | 3/2007 | Tsai et al. | 235/441 |
| 2007/0174257 A1* | 7/2007 | Howard | 707/3 |
| 2007/0204022 A1* | 8/2007 | Hsu et al. | 709/223 |
| 2008/0160974 A1* | 7/2008 | Vartiainen et al. | 455/414.3 |
| 2008/0282180 A1* | 11/2008 | Glasgow et al. | 715/770 |

\* cited by examiner

*Primary Examiner* — Dai A Phuong

(57) ABSTRACT

A mobile device for personal computer assistance is provided. The mobile device is configured for wireless communication over a mobile device network. The mobile device includes an interface configured to establish a communication link between the mobile device and a personal computer. The mobile device also includes a storage device configured to store session information from a personal computer and to retrieve the session information for another personal computer.

16 Claims, 4 Drawing Sheets

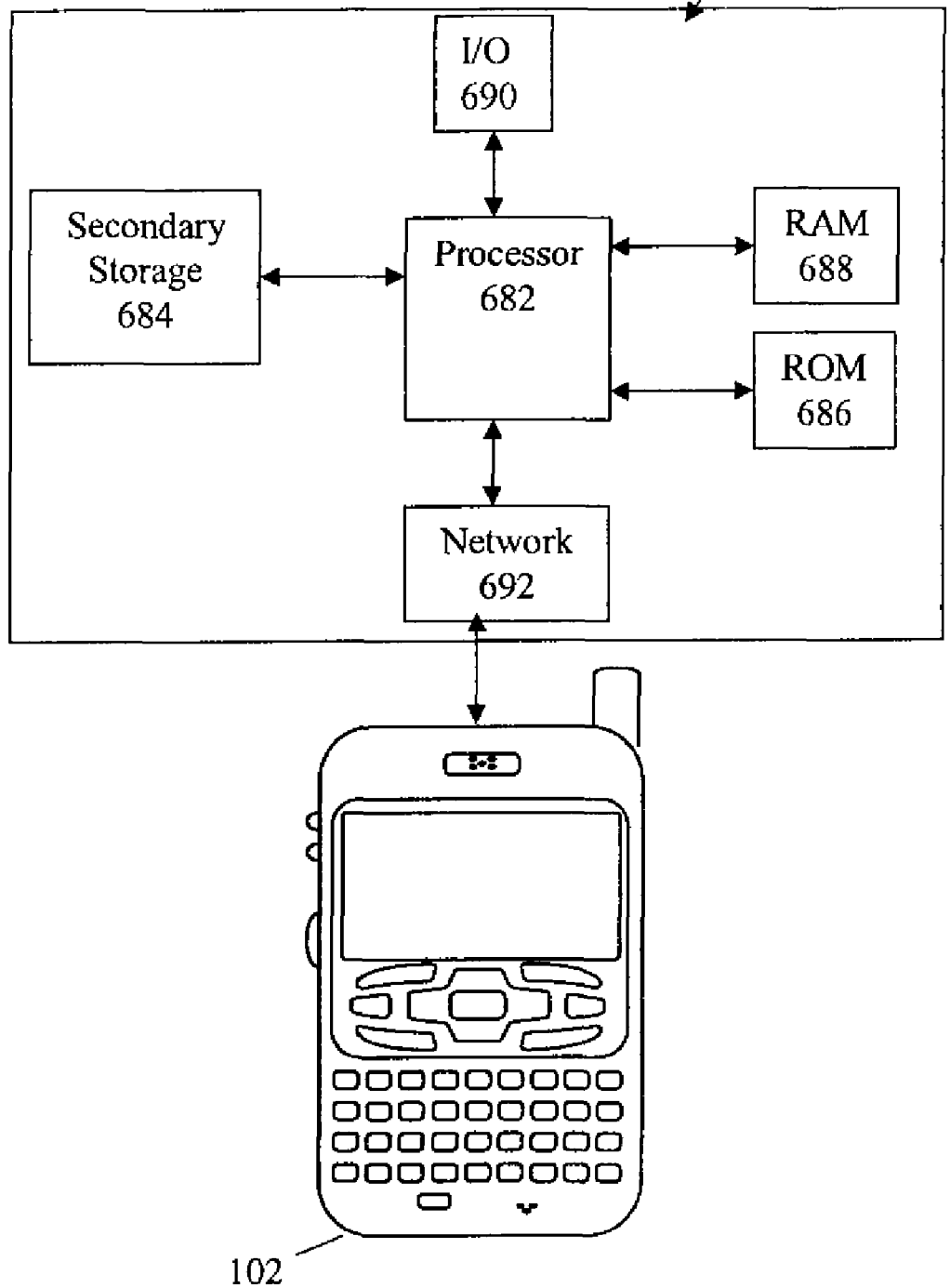

MOBILE DEVICE AS A PERSONAL COMPUTER ASSISTANT

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A user of personal computers may spend a significant amount of time and effort during a session on a personal computer. The personal computer stores session information to assist the user in using the personal computer during the session and in subsequent sessions. The session information can include personal financial information for the user, passwords, web form data, settings, results of lengthy searches, web browser configurations, bookmarks, cookies, and a history of websites visited. When the user begins a new session on a different personal computer, the different personal computer does not have access to the session information from the prior session on the previous personal computer. Because the different personal computer cannot access the prior session information, the user may have to spend significant time and effort reentering the personal financial information, the passwords, and the web form data, and may spend significant time and effort recreating the settings, the results of lengthy searches, web browser configurations, bookmarks, cookies, and the history of websites visited. This repetitive experience can be time consuming and frustrating for users who access one computer at work and another computer at home. These problems are even greater for those who use personal computers that are available in a variety of public places, such as libraries, schools, and universities, as these users may have to repeat the process for every public personal computer that they use.

SUMMARY

In some embodiments, a mobile device for personal computer assistance is provided. The mobile device is configured for wireless communication over a mobile device network. The mobile device includes an interface configured to establish a communication link between the mobile device and a personal computer. The mobile device also includes a storage device configured to store session information from a personal computer and to retrieve the session information for use on another personal computer.

In some other embodiments, a mobile device configured to support a personal computer is provided. The mobile device includes a wireless interface to a network; an interface to a terminal; and a processor. The processor communicates with the terminal over the interface and enables a user of the terminal to access an application provided by the network.

In some other embodiments, a method for accessing a mobile device network application is provided. Information for a mobile device network application is displayed on a mobile device user interface. User input is received via the mobile device user interface. The user input is communicated to the mobile device network application over a wireless communication link to a mobile device network.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 6 shows an illustrative general purpose computer system suitable for implementing portions of the several embodiments of the present disclosure.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Methods and systems are disclosed for using for a mobile device as a personal computer assistant. In some embodiments, the mobile device is a mobile phone that includes a link for communicating with personal computers. The mobile phone can store session information from a user session on a personal computer. The session information can include confidential information such as financial information, user names, and passwords. After storing the session information on the mobile phone or on a network server accessed by the mobile phone, the mobile phone can access the stored session information to configure a different personal computer with the stored session information. Because of this configuration, the user does not have to spend the time and effort reentering the information from the previous session as the current computer is configured with this same session information.

In some embodiments, the personal computer is a thin client functioning as a traditional terminal. The mobile device can serve as a gateway to network applications, thereby enabling a user of the thin client to access an application provided by a network server. The user can access applications using a more complete keyboard than the keys offered by the mobile device, an enhanced mouse, and/or an enhanced display. The user can access the applications on a subscription basis instead of purchasing the applications. Leveraging the mobile device to access network applications provides the use of these applications to users who cannot afford to purchase their own fully configured personal computer. In some embodiments, the user interface of the mobile device functions as a traditional terminal.

Figure 1:
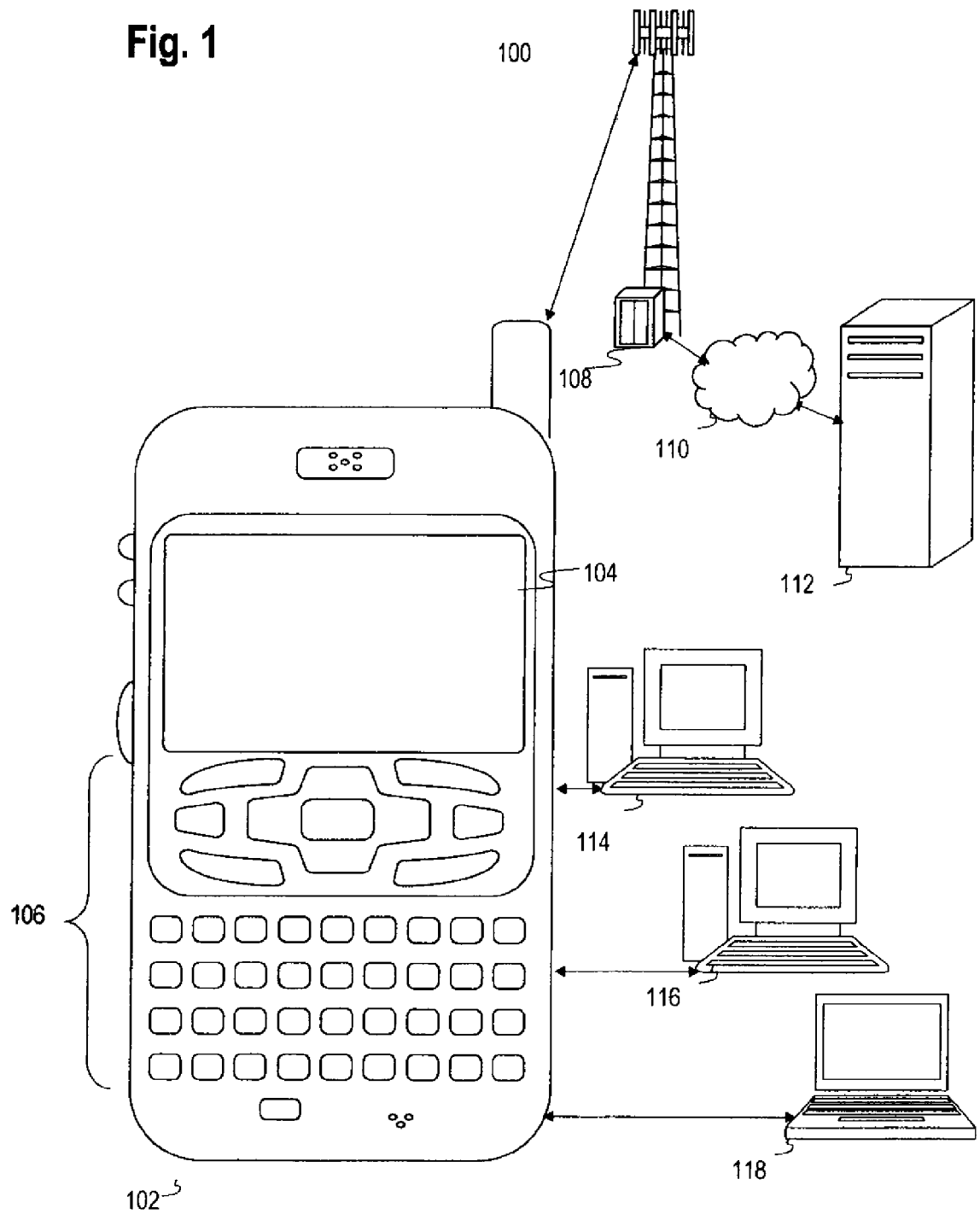
FIG. 1 shows an illustrative wireless communications system for a mobile device as a personal computer assistant.

FIG. 1 shows a wireless communications system 100 that demonstrates an illustrative context for the systems and methods of the present disclosure. The wireless communication system includes a mobile device 102. Though illustrated as a mobile phone, the mobile device 102 may take various forms including a wireless handset, a pager, a personal digital assistant (PDA), and an electronic key fob for keyless entry. Many suitable mobile devices combine some or all of these functions.

The mobile device 102 includes a display 104 and a touch-sensitive surface or keys 106 with which to interact with a user. The mobile device 102 may present options for the user to select, controls for the user to actuate, and/or cursors or other indicators for the user to direct. The mobile device 102 may further accept data entry from the user, including numbers to dial or various parameter values for configuring the operation of the mobile device 102. The mobile device 102 may further execute one or more software or firmware applications in response to user commands. These applications may configure the mobile device 102 to perform various customized functions in response to user interaction, including personal computer assistance.

In the illustrative system 100, the mobile device 102 communicates through a cell tower 108 and through a wired or wireless network 112 to access information on various servers, such as a content server 112. The content server 112 may provide content that may be shown on the display 104. While one content server is shown in FIG. 1, other servers could be present. The content server 112 communicates with the mobile device 102 through the network 110 and the cell tower 108 by a standard wireless telephony protocol (such as code division multiple access), a wireless internet connection, or some other means of wireless communication. The mobile device 102 may also communicate through a cable or wireless connection with a nearby computer, such as a first personal computer 114, a second personal computer 116, or a thin client 118. The thin client 118 is a computer, or client, in a client-server architecture network that depends primarily on the central server, such as the content server 112, for processing activities. In contrast, the first personal computer 114 and the second personal computer 116 are thick clients or fat clients that do as much processing as possible and pass only data required for communications and archival storage to the content server 112.

Figure 2:
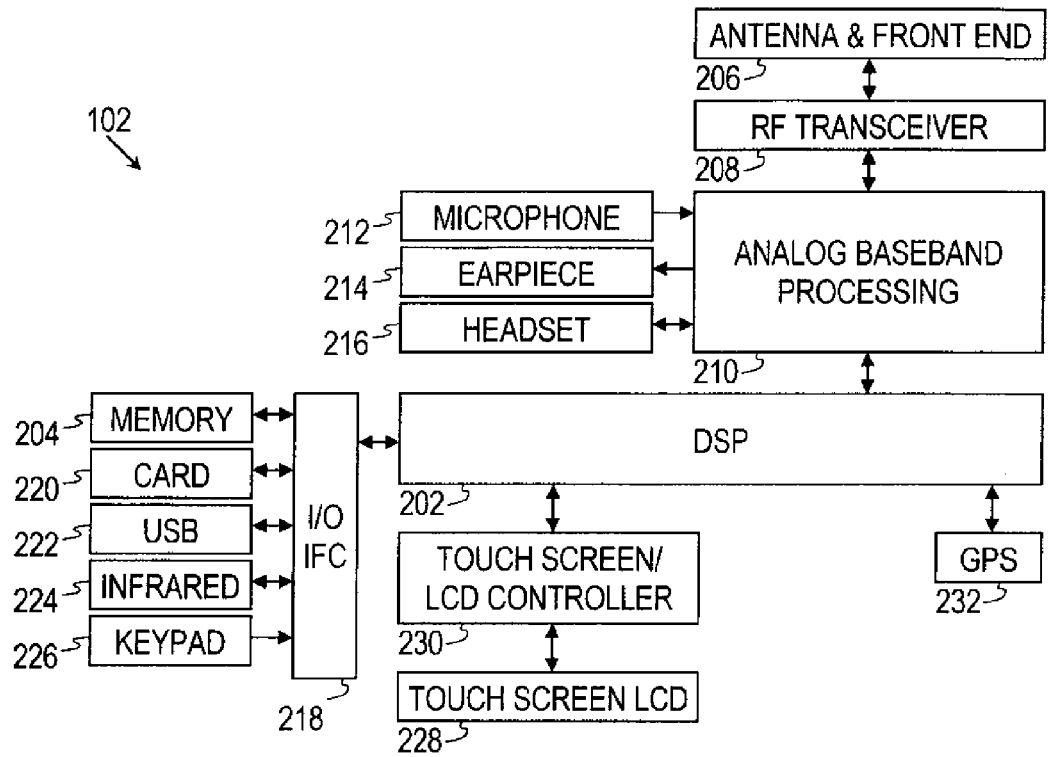
FIG. 2 shows a block diagram of an illustrative mobile device.

FIG. 2 shows a block diagram of the mobile device 102. The mobile device 102 includes a digital signal processor (DSP) 202 and a memory 204. As shown, the mobile device 102 may further include an antenna and front end unit 206, a radio frequency (RF) transceiver 208, an analog baseband processing unit 210, a microphone 212, an earpiece speaker 214, a headset port 216, an input/output interface 218, a memory card 220, a universal serial bus (USB) port 222, an infrared port 224, a keypad 226, a liquid crystal display (LCD) with a touch sensitive surface 228, a touch screen/LCD controller 230, and a global positioning system (GPS) sensor 232.

The DSP 202 or some other form of controller or central processing unit operates to control the various components of the mobile device 102 in accordance with embedded software or firmware stored in the memory 204. In addition to the embedded software or firmware, the DSP 202 may execute other applications stored in the memory 204 or made available via information carrier media such as portable data storage media like the memory card 220 or via wired or wireless network communications. The application software may comprise a compiled set of machine-readable instructions that configure the DSP 202 to provide the desired functionality, or the application software may be high-level software instructions to be processed by an interpreter or compiler to indirectly configure the DSP 202.

The antenna and front end unit 206 converts between wireless signals and electrical signals, enabling the mobile device 102 to send and receive information from a cellular network or some other available wireless communications network. The RF transceiver 208 provides frequency shifting, e.g., converting received RF signals to baseband and converting baseband transmit signals to RF. The analog baseband processing unit 210 provides channel equalization and signal demodulation to extract information from received signals, modulates information to create transmit signals, and provides analog filtering for audio signals. To that end, the analog baseband processing unit 210 includes ports for connecting to the built-in microphone 212 and the earpiece speaker 214 that enable the mobile device 102 to be used as a cell phone.

The DSP 202 can send and receive digital communications with a wireless network via the analog baseband processing unit 210. The input/output interface 218 interconnects the DSP 202 and various memories and interfaces. The memory 204 and the removable memory card 220 may provide software and data to configure the operation of the DSP 202. The USB port 222, the infrared port 224, and other optional ports such as a Bluetooth interface or an IEEE 802.11 compliant wireless interface enable the mobile device 102 to communicate with other nearby mobile devices, personal computers, thin clients, and/or wireless base stations. In some contemplated systems, the mobile device 102 is able to wirelessly exchange information at a point-of-sale when placed near a suitable transceiver.

The keypad 226 couples to the DSP 202 via the I/O interface 218 to provide one mechanism for the user to make selections, enter information, and otherwise provide input to the mobile device 102. Another input mechanism may be the touch screen display 228, which may also display text and/or graphics to the user. The display controller 230 couples the DSP 202 to the touch screen display 228.

The GPS sensor 232 is coupled to the DSP 202 to decode global positioning system signals, thereby providing at least one technology for the mobile device 102 to determine its position. Various other peripherals may also be included to provide additional functions, e.g., radio and television reception.

Figure 3:
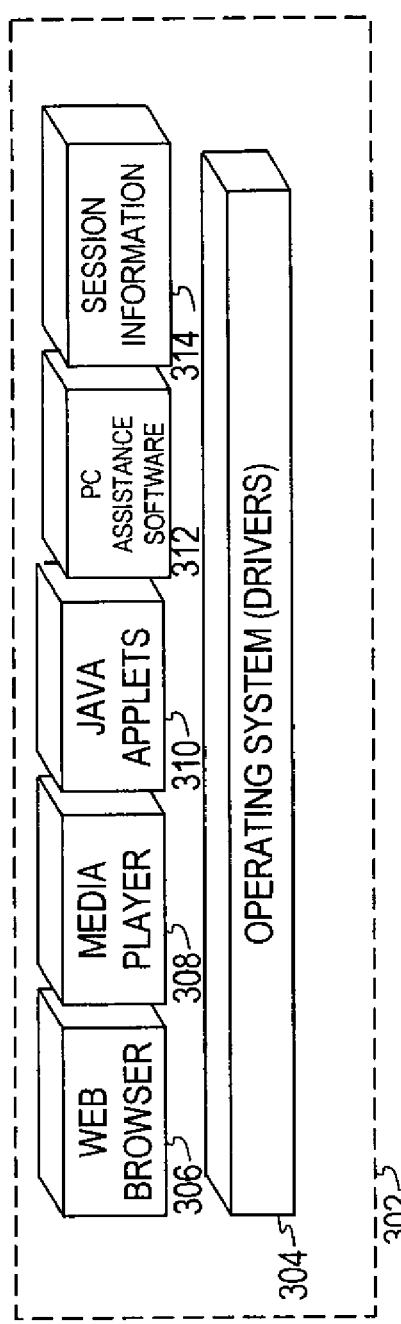
FIG. 3 shows a block diagram of an illustrative software configuration for a mobile device.

FIG. 3 illustrates a software environment 302 that may be implemented by the DSP 202. The DSP 202 executes operating system software 304 that provides a platform from which the rest of the software operates. The operating system software 304 provides drivers for the mobile device hardware to make standardized interfaces available to application software. The operating system software 304 may transfer control between applications running on the mobile device 102. Also shown in FIG. 3 are a web browser 306 application, a media player 308 application, Java applets 310, personal computer (PC) assistance software 312, and session information 314. The web browser 306 application configures the mobile device 102 to operate as a web browser, allowing the user to enter information into forms and select links to retrieve and view web pages, including content from the content server 112. The media player 308 application configures the mobile device to retrieve and play audio or audiovisual media on its own output components. The Java applets 310 may configure the mobile device 102 to provide games, utilities, and other functionality on the mobile device 102. These are further examples of content that may be provided by the content server 112.

The PC assistance software 312 enables the mobile device 102 to retrieve session information from a browser on a personal computer and to also configure the browser based on previously stored session information. The session information 314 can be the information stored from previous sessions on personal computers. For example, the session information can include a uniform resource locator history, a bookmark, financial information, e-commerce information, a web browser configuration, a search history, a user setting, a browser setting, web browser data, a password, a cookie, and personal data. Additionally, the session information 314 can be other forms of information collection, including desktop configurations, application defaults, etc.

Figure 4:
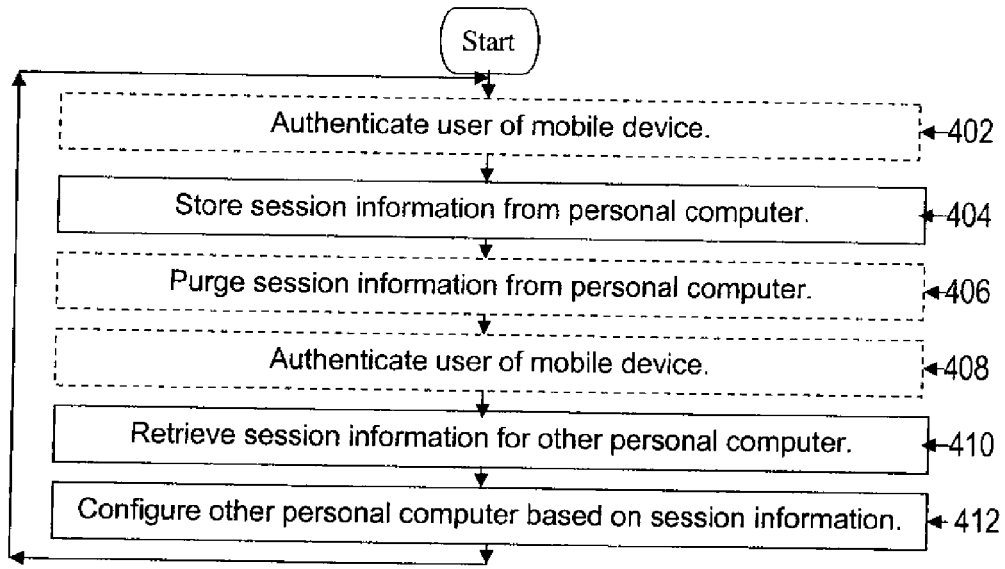
FIG. 4 shows a flowchart of a method for a mobile device as a personal computer assistant according to some embodiments of the present disclosure.

FIG. 4 is a flowchart illustrating a method for using a mobile device as a personal computer assistant according to some embodiments of the present disclosure. In accordance with this method, the mobile device 102 can store the session information from a session on a first personal computer and configure a second personal computer based on the stored session information 314.

In box 402, the mobile device 102 optionally authenticates the user of the mobile device 102. For example, the mobile device 102 establishes a communication link with the first personal computer 114, and the mobile device 102 authenticates the user of the mobile device 102 when the mobile device 102 receives user input that indicates the user is requesting to store session information from a session on the first personal computer 114. The user can enter this input either via the first personal computer 114 or the keys 106 of the mobile device 102. When the mobile device 102 receives this input, the mobile device 102 can request that the user authenticates their identity before enabling the user to store the session information. The user can authenticate their identity through the use of a user name, a password, biometrics, or some other security system.

As yet another option, the user can communicate through the mobile device 102 with the content server 112 to authenticate and identify the mobile device 102 for the specified use by the electronic serial number (ESN) or the mobile device number (MDN) for the mobile device 102. The encryption used by the mobile device 102 to communicate with the content server 112 may be more secure than the encryption used by the first personal computer 114 to authenticate the user. These two authentication steps provide layers of security to ensure that the user of the mobile device 102 and the mobile device 102 are properly coupled and authorized to store the session data for the user from the first personal computer 114. The mobile device 102 can authenticate the user before the session begins on the first personal computer 114, during the session, and after the session ends.

In box 404, the PC assistance software 312 stores session information from a personal computer. For example, after the session is over the user inputs a request to store session information, the mobile device 102 authenticates the user, and the PC assistance software 312 stores session information from a session on the first personal computer 114. Alternatively, the PC assistance software 312 stores the session information from the first personal computer 114 during the session. If during the session the user requests for the PC assistance software 312 to store session information, the PC assistance software 312 can store the information in real time or near real time as updates to the session information occur, based on specific times or occasions requested by the user, in a time batched mode when session and communication activity is low, or upon completion of the session.

When requesting to store session information, the user can specify a session name to identify the session, such as naming a session on the first personal computer 114 as "loan application." The session information from the session on the first personal computer 114 can include personal financial information for the user, passwords, web form data, and a history of websites visited while using the first personal computer 114 to apply for a personal loan. The PC assistance software 312 can store the session information in a storage device located on the mobile device 102, such as a flash memory resident on the mobile device 102, or on the content server 112. The flash memory can be integrated with a universal serial bus interface. The PC assistance software 312 can store information from the session as the session information 314. Storing all of the session information on the content server 112 provides the user the flexibility to change the mobile device 102 for a new mobile device without concerns about transferring the stored session information 314 from the mobile device 102 to the new mobile device.

Because the mobile device 102 can both communicate with the first personal computer 114 and access the same network 110 that is accessed by the first personal computer 114, the user can also use the mobile device 102 to supplement the communication between the first personal computer 114 and the network 110. For example, if the connection between the network 110 and the first personal computer 114 offers only a limited bandwidth that results in slow communication, the user can activate the PC assistance software 312 to supplement the connection, thus improving the speed of communication between the first personal computer 114 and the network 110.

In box 406, the PC assistance software 312 optionally purges session information from the personal computer. For example, after the session on the first computer 114 is over and the PC assistance software 312 has stored the session information 314, the user of the mobile device 102 protects his confidential information included in the session by entering an input to purge the session information from the first personal computer 114. The user can enter the input either via the first personal computer 114 or via the keys 106 of the mobile device 102.

In box 408, the mobile device 102 optionally authenticates the user of the mobile device 102. For example, the mobile device 102 authenticates the user of the mobile device 102 when the mobile device 102 receives user input that indicates the user is requesting to retrieve the session information 314 for the second personal computer 116. The user can enter this input either via the second personal computer 116 or via the keys 106 of the mobile device 102. When the mobile device 102 receives this input, the mobile device 102 can request that the user authenticates their identity before enabling the user to retrieve the session information 314. The user can authenticate their identity through the use of a user name, a password, biometrics, or some other security system. As yet another option, the user can communicate through the mobile device 102 with the content server 112 to authenticate and identify the mobile device 102 for the specified use by the ESN or the MDN for the mobile device 102. These two authentication steps provide layers of security to ensure that the user of the mobile device 102 and the mobile device 102 are properly coupled and authorized to retrieve the session data for the second personal computer 116.

In box 410, the PC assistance software 312 retrieves the session information 314 for another personal computer. For example, after the user inputs a request to retrieve the session information 314 stored from the session on the first personal computer 114, the mobile device 102 authenticates the user and the PC assistance software 312 retrieves the session information 314 to be used for the second personal computer 116. When requesting to retrieve the session information 314, the user can select from previously named sessions to identify the specific session to be retrieved, such as a session on the first personal computer 114 named "loan application." The mobile device 102 can present the option to select from sessions previously named "loan application," "tax forms," and "research on used cars." The session information 314 previously stored from the session on the first personal computer 114 can include personal financial information for the user, passwords, web form data, and a history of websites visited while using the first personal computer 114 to apply for a personal loan. The PC assistance software 312 can retrieve the session information 314 from a storage device located on the mobile device 102, such as a flash memory resident on the mobile device 102, or located on the content server 112.

In box 412, the PC assistance software 312 configures the other personal computer based on the session information 314. For example, the PC assistance software 312 configures the second personal computer 116 based on the stored session information 314 from the session on the first personal computer 114. By configuring the second personal computer 116 based on the session information 314, the second personal computer 116 now includes personal financial information for the user, passwords, web form data, and a history of websites visited while using the first personal computer 114 for a loan application. Although the example describes two personal different computers, the PC assistance software 312 can reconfigure the first personal computer 114 with the stored session information 314 from a prior session on the same first personal computer 114. The PC assistance software 312 can execute this reconfiguration in situations when the user is reusing the same publicly available personal computer, such as a personal computer in a university computer lab.

Figure 5:
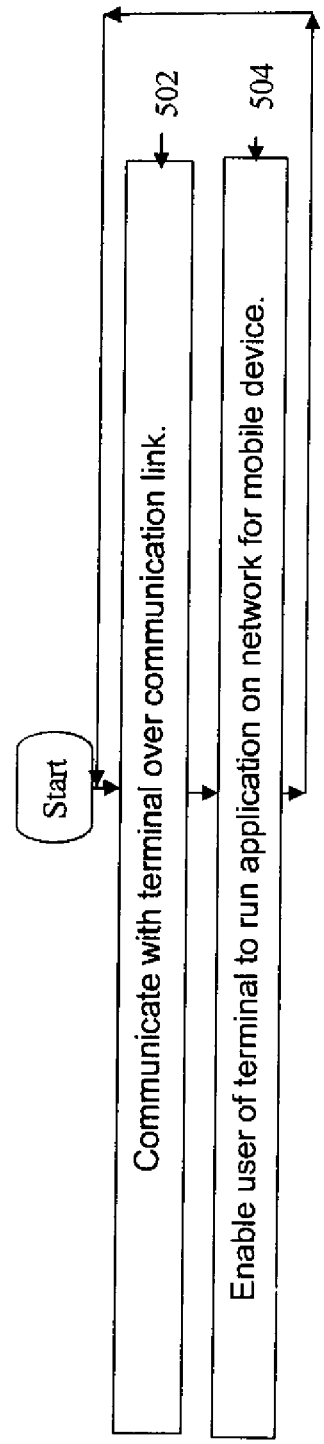
FIG. 5 shows another flowchart of a method for a mobile device as a personal computer assistant according to some embodiments of the present disclosure.

FIG. 5 is another flowchart illustrating a method for a mobile device as a terminal assistant according to some embodiments of the present disclosure. The mobile device 102 can use the method to provide a terminal, such as a personal computer or a thin client, access to network applications.

In box 502, the mobile device 102 communicates with a terminal over a wireless interface. For example, the user of the mobile device 102 does not currently have access to a fully-configured personal computer, but wants to access a software application designed for execution on a personal computer using a screen and a keyboard that are enhanced relative to the display 104 and entry keys 106 of the mobile device 102. Because the thin client 118 has a larger display screen and a more complete keyboard than the mobile device 102, the user enters input to the mobile device 102 or to the thin client 118 that prompts a processor on the mobile device to communicate with the thin client 118. Alternatively, the thin client 118 may have a touch screen for user input and user output.

In box 504, the mobile device 102 enables the user of the terminal to run an application on the network for the mobile device 102. For example, the processor on the mobile device 102 serves as a gateway between the thin client 118 and the content server 112, communicating via the cell tower 108 and the network 110. Using the mobile device 102 as a gateway, the user of the thin client 118 runs a word processor application on the network 110 for the mobile device 102. In this manner, the user can run the word processor application using the more complete keyboard, or other interface such as a mouse, offered by the thin client 118 or the first personal computer 114 instead of using the keys 106 on the mobile device 102. The user can access applications based on a subscription to an application service instead of paying the full amount required to purchase the application to be used. Furthermore, the user can use the application to create a display screen using the thin client 118 or the first personal computer 114 and access the created display screen on the mobile phone.

The system may optionally authenticate the user and/or the mobile device 102 before enabling use of the terminal service to run an application on the network. For example, the mobile device 102 authenticates the user of the mobile device 102 when the mobile device 102 receives user input that indicates the user is requesting to retrieve or run an application on the network 110. The user can enter this input either via the thin client 118 or via the keys 106 of the mobile device 102. When the mobile device 102 receives this input, the mobile device 102 can request that the user authenticates their identity before enabling the user to run an application on the network 110. The user can authenticate their identity through the use of a user name, a password, biometrics, or some other security system. As yet another option, the user can communicate through the mobile device 102 with the content server 112 to authenticate and identify the mobile device 102 for the specified use by the ESN or the MDN for the mobile device 102. These two authentication steps, which may be used separately or in combination, can provide layers of security to ensure that the user of the mobile device 102 and the mobile device 102 are authorized and authenticated.

In some embodiments, the mobile device 102 can also have an enhanced keyboard, relative to user interfaces on mobile phones, to enable subscribing to a service that provides network-accessible computing resources for use by the mobile device user. The enhanced keyboard also enables selecting the application on the computing resources to run and interacting with the application via the mobile device 102. The mobile device 102 can also have an enhanced screen, relative to user interfaces on mobile phones, to further enable interacting with the application via the mobile device 102.

Parts of the system described above may be implemented on any general-purpose server with sufficient processing power, memory resources, and network throughput capability to handle the necessary workload placed upon it. FIG. 6 can illustrate the content server 112, the first personal computer 114, the second personal computer 116, and/or the thin client 118, which are suitable for implementing one or more embodiments disclosed herein. The content server 112 includes a processor 682 (which may be referred to as a central processor unit or CPU) that is in communication with memory devices including secondary storage 684, read only memory (ROM) 686, random access memory (RAM) 688, input/output (I/O) 690 devices, and network connectivity devices 692. The processor 682 may be implemented as one or more CPU chips.

The secondary storage 684 is typically comprised of one or more disk drives or tape drives and is used for non-volatile storage of data and as an over-flow data storage device if the RAM 688 is not large enough to hold all working data. The secondary storage 684 may be used to store programs that are loaded into the RAM 688 when such programs are selected for execution. The ROM 686 is used to store instructions and perhaps data that are read during program execution. The ROM 686 is a non-volatile memory device that typically has a small memory capacity relative to the larger memory capacity of secondary storage. The RAM 688 is used to store volatile data and perhaps to store instructions. Access to both the ROM 686 and the RAM 688 is typically faster than to secondary storage 684.

The I/O 690 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 692 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 692 devices may enable the processor 682 to communicate with an Internet, one or more intranets, or the mobile device 102. With such a network connection, it is contemplated that the processor 682 might receive information from the network, or might output information to the network in the course of performing the above-described method steps. Such information, which is often represented as a sequence of instructions to be executed using processor 682, may be received from and outputted to the network, for example, in the form of a computer data signal embodied in a carrier wave.

Such information, which may include data or instructions to be executed using processor 682 for example, may be received from and outputted to the network, for example, in the form of a computer data baseband signal or signal embodied in a carrier wave. The baseband signal or signal embodied in the carrier wave generated by the network connectivity 692 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 682 executes instructions, codes, computer programs, scripts that it accesses from hard disk, floppy disk, optical disk (these various disk based systems may all be considered the secondary storage 684), the ROM 686, the RAM 688, or the network connectivity devices 692.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A mobile device configured for wireless communication over a mobile device network, comprising:
   an interface configured to establish a communication link between the mobile device and one or more personal computers; and
   a storage device configured to receive and store session information from a plurality of sessions on a first personal computer, wherein the session information comprises at least one of a uniform resource locator history, a bookmark, financial information, e-commerce information, a web browser configuration, a search history, a user setting, a browser setting, web browser data, a password, a cookie, and personal data, and to select and deliver the session information associated with one of the plurality of sessions to a second personal computer, wherein the second personal computer is configured based on the session information associated with the one of the plurality of sessions on the first personal computer, wherein the mobile device is further configured to provide additional bandwidth for the first personal computer to communicate with the mobile device network, wherein the mobile device is further configured to make remote computing resources accessible from the first personal computer, wherein making the remote computer resources accessible from the first personal computer comprises making an application provided by the mobile device network accessible from the first personal computer, and wherein the first personal computer is a thin client that depends at least in part on a server for processing activities.

2. The mobile device of claim 1 wherein the mobile device is further configured to purge the session information from the first personal computer.

3. The mobile device of claim 1 further comprising personal computer assistance software to output the session information to a web browser on the second personal computer and receive the session information from the web browser on the second personal computer.

4. The mobile device of claim 1 wherein communications over the communication link are controlled by input from at least one of the mobile device, the first personal computer, and the second personal computer.

5. The mobile device of claim 1 wherein the mobile device is further configured to store the session information to the mobile device network and receive the session information from the mobile device network.

6. The mobile device of claim 1 wherein to select and deliver the session information for the second personal computer comprises authenticating the user of the mobile device.

7. The mobile device of claim 1 wherein to receive and store the session information from the first personal computer comprises authenticating the user of the mobile device.

8. The mobile device of claim 1 wherein the communication link is one of a cable and a wireless connection.

9. The mobile device of claim 1 wherein the storage device is further configured to store the session information based on one of an update, a request by the user, a timed batch mode, and a completion of a session.

10. The mobile device of claim 1 wherein the storage device is a flash memory data storage device integrated with a universal serial bus interface.

11. The mobile device of claim 1 wherein the remote computing resources further include storage for user files and user settings that are preserved between accesses by a user.

12. The mobile device of claim 1 wherein the application is accessed based on a subscription to an application service.

13. The mobile device of claim 1 wherein the application is software designed for execution on the first personal computer.

14. The mobile device of claim 1 wherein the first personal computer includes a touch screen to output content to a user and receive input from a user.

15. The mobile device of claim 1 wherein the storage device is configured to store session information from a plurality of sessions on a plurality of personal computers.

16. A mobile device configured for wireless communication over a mobile device network, comprising:
  an interface configured to establish a communication link between the mobile device and one or more personal computers; and
  a storage device configured to receive and store session information from a session on a first personal computer, wherein the session information comprises at least one of a uniform resource locator history, a bookmark, financial information, e-commerce information, a web browser configuration, a search history, a user setting, a browser setting, web browser data, a password, a cookie, and personal data, and to select and deliver the session information to a second personal computer, wherein the second personal computer is configured based on the session information, wherein the mobile device is further configured to make remote computing resources accessible from the first personal computer, wherein making the remote computer resources accessible from the first personal computer comprises making an application provided by the mobile device network accessible from the first personal computer, wherein the mobile device is further configured to provide additional bandwidth for the first personal computer to communicate with the mobile device network, and wherein the first personal computer is a thin client that depends at least in part on a server for processing activities.

* * * * *